United States Patent
Berteau

(10) Patent No.: US 8,103,110 B2
(45) Date of Patent: Jan. 24, 2012

(54) SYSTEM AND METHOD FOR BAYESIAN TEXT CLASSIFICATION

(76) Inventor: Stefan A. Berteau, Washington, DC (US)

( * ) Notice: Subject to any disclaimer, the term of this patent is extended or adjusted under 35 U.S.C. 154(b) by 923 days.

(21) Appl. No.: 12/121,524

(22) Filed: May 15, 2008

(65) Prior Publication Data

US 2009/0285474 A1    Nov. 19, 2009

(51) Int. Cl.
*G06K 9/62* (2006.01)
(52) U.S. Cl. ............... 382/224; 382/228; 382/229
(58) Field of Classification Search .......... 382/224, 382/228, 229, 230, 231
See application file for complete search history.

(56) References Cited

U.S. PATENT DOCUMENTS

| | | | | |
|---|---|---|---|---|
| 7,725,475 B1 * | 5/2010 | Alspector et al. | | 707/758 |
| 7,752,159 B2 * | 7/2010 | Nelken et al. | | 706/62 |
| 7,945,627 B1 * | 5/2011 | Musat | | 709/206 |
| 2008/0059590 A1 * | 3/2008 | Sarafijanovic et al. | | 709/206 |
| 2008/0168135 A1 * | 7/2008 | Redlich et al. | | 709/204 |

OTHER PUBLICATIONS

Yerazunis, W.S., "Sparse Binary Polynomial Hashing and the CRM114 Discriminator," Mitsubishi Electric Research Laboratories, http://crm114.sourceforge.net/docs/CRM114_paper.html, 5 pages, Jan. 20, 2003 Printed Sep. 17, 2008.

Robinson, G., "A Statistical Approach to the Spam Problem," LINUX™ Journal, http://www.linuxjournal.coml/article/6467, 10 pages, Mar. 1, 2003 Printed Sep. 17, 2008.

* cited by examiner

*Primary Examiner* — Phuoc Tran
(74) *Attorney, Agent, or Firm* — Baker Botts L.L.P.

(57) ABSTRACT

A method for classifying text comprises receiving data containing text and parsing a plurality of tokens out of the text. A plurality of metatokens are generated for each token, wherein the metatokens comprise strings of text and groupings of strings of text. The method further comprises calculating a probability that the data falls into a certain category, using the tokens and metatokens. The probability is compared to a threshold value and the data is classified into the certain category if the probability is greater than the threshold value.

18 Claims, 2 Drawing Sheets

SYSTEM AND METHOD FOR BAYESIAN TEXT CLASSIFICATION

TECHNICAL FIELD

The present disclosure relates generally to data classification, and more particularly to a system and method for Bayesian text classification.

BACKGROUND

Text classification may be relied on for various different computer applications. This classification may often use probabilistic techniques to analyze text and categorize it into one of two or more categories. Text classification is often used for various security measures, such as determining the authenticity of programs or documents. In another common form, it may be used to filter "spam" or unsolicited e-mail. Existing filters often rely on probabilistic text classification, basing their classification on the presence and frequency of particular words contained in an e-mail. While such filters can be effective, they can also be somewhat limited and susceptible to spammers' attempts at circumvention.

SUMMARY OF EXAMPLE EMBODIMENTS

The present disclosure is directed to a system and method of Bayesian text classification. The teachings of the present disclosure may allow for more accurate text classification.

In accordance with a particular embodiment of the present disclosure, a method for classifying text is disclosed. The method comprises receiving data containing text and parsing a plurality of tokens out of the text. A plurality of metatokens are generated for each token, wherein the metatokens comprise strings of text and groupings of strings of text. The method further comprises calculating a probability that the data falls into a certain category, using the tokens and metatokens. The probability is compared to a threshold value and the data is classified into the certain category if the probability is greater than the threshold value. More specifically, the probability may be calculated using Bayes rules and one or more metaprobabilities.

In accordance with another aspect of the present invention, a system for classifying text is disclosed. The system comprises an interface operable to receive data containing text and a processor operable to parse a plurality of tokens out of the text. The processor is further operable to generate a plurality of metatokens for each token, wherein the metatokens comprise strings of text and groupings of strings of text. The processor is further operable to calculate a probability that the data falls into a certain category, using the tokens and metatokens, compare the probability to a threshold value, and then classify the data into the certain category if the probability is greater than the threshold value.

In accordance with another aspect of the present invention, logic encoded in a computer readable medium is disclosed. The logic is operable, when executed on a processor to receive data containing text and parse a plurality of tokens out of the text. The logic is further operable to generate a plurality of metatokens for each token, wherein the metatokens comprise strings of text and groupings of strings of text. the logic is further operable to calculate a probability that the data falls into a certain category, using the tokens and metatokens, compare the probability to a threshold value, and classify the data into the certain category if the probability is greater than the threshold value.

Technical advantages of particular embodiments of the present disclosure include the use of tokens and metatokens in the classification of text. The use of these tokens and metatokens may allow for more accurate text classification that uses probabilistic filtering to take into account aspects of style and grammar, in addition to ordinary vocabulary.

Further technical advantages of particular embodiments include the use of metaprobabilities based on user input. This may allow the text classification system to learn from past experience, increasing accuracy.

Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and for further features and advantages thereof, reference is now made to the following description taken in conjunction with the accompanying drawings, in which.

DETAILED DESCRIPTION

Text classification may be used in many applications, including spam filtering, computer file location, and other document filtering. Many probabilistic text classifiers base their classification on the presence and frequency of particular words contained in a document. While such classifiers or filters can be effective, they only rely on vocabulary, and fail to take into consideration aspects such as probabilistic grammar, syntax, or common usage. Although the use of text classification is widely varied, its use in spam filters may be particularly helpful and will be described throughout this application. This particular application is intended for illustrative purposes only, and is not intended to limit the scope of application of the present disclosure.

In accordance with the teachings of the present disclosure, a method for Bayesian text classification includes a method that addresses the ability to more effectively classify text and filter data. An object of this new method is to allow a filter to categorize text based on vocabulary, as well as probabilistic representations of grammar, syntax, and uncommon usage.

According to particular embodiments of the present disclosure, a method for classifying text is disclosed. The method comprises receiving data containing text and parsing a plurality of tokens out of the text. A plurality of metatokens are generated for each token, wherein the metatokens comprise strings of text and groupings of strings of text. The method further comprises calculating a probability that the data falls into a certain category, using the tokens and metatokens. The probability is compared to a threshold value and the data is classified into the certain category if the probability is greater than the threshold value. According to particular embodiments, the probability may be calculated using Bayes rules and one or more metaprobabilities.

Figure 1:
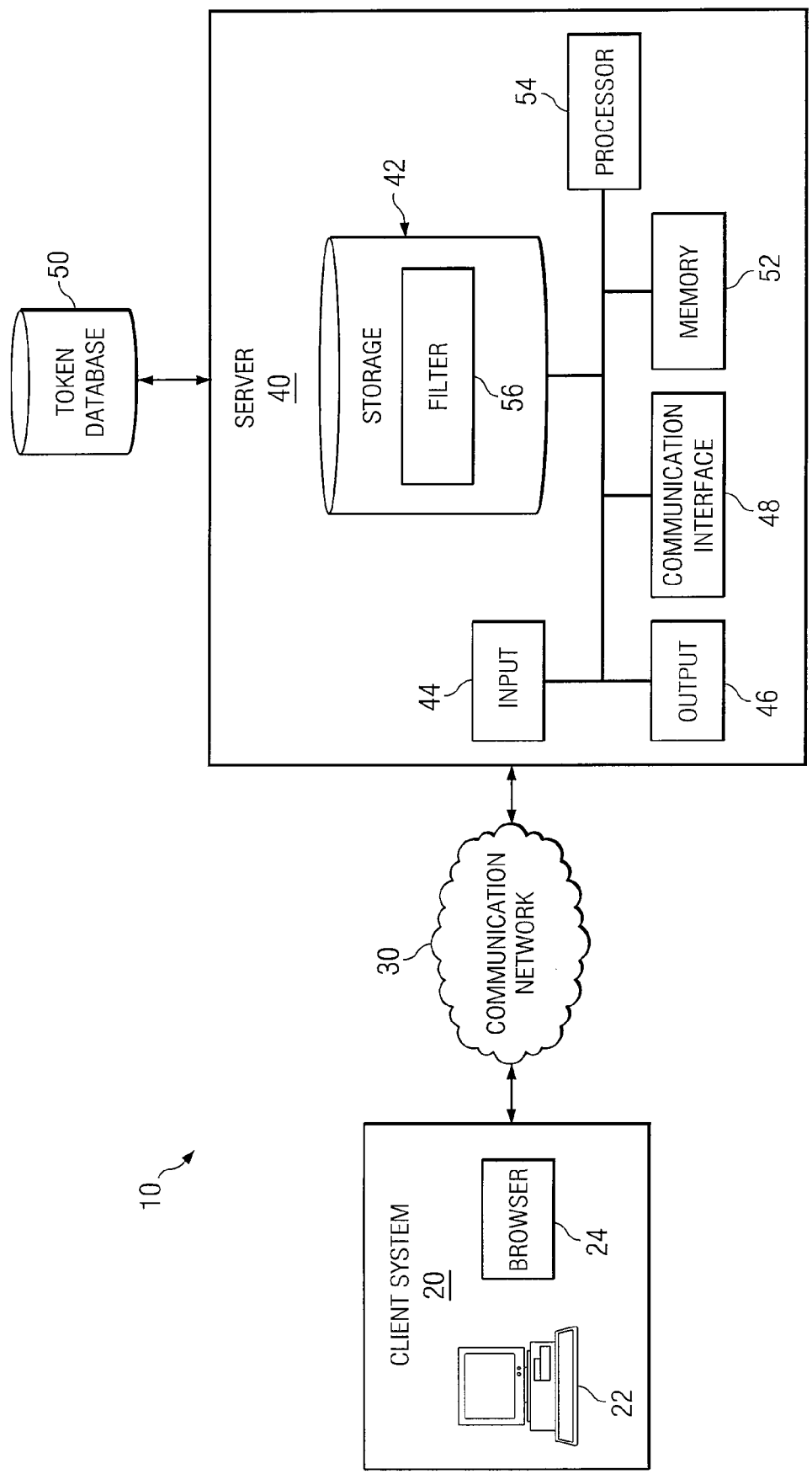
FIG. 1 is a schematic drawing illustrating a computer network configuration suitable for use within particular embodiments of the present invention.

FIG. 1 illustrates a communications system, generally designated by reference numeral 10. Communications system 10 includes client system 20, communications network 30, server 40, token database 50, and filter 56.

Client system 20 includes a computer terminal 22, or other medium for accomplishing electronic communication. Terminal 22 may also include specific software, including a browser 24 which allows standardized communication with network server 40. Although the illustrated embodiment depicts client system 20 as a separate element, in alternative embodiments client system 20 may reside locally on server 40.

Server 40 may refer to any device operable to deliver e-mail messages that are sent to the client system 20. According to the illustrated embodiment, server 40 includes storage device 42, an input device 44, an output device 46, a communication interface 48, a memory device 52, and a processor 54.

Input device 44 may refer to any suitable device operable to input, select, and/or manipulate various data and information. Input device 44 may include, for example, a keyboard, mouse, graphics tablet, joystick, light pen, microphone, scanner, or other suitable input device.

Output device 46 may refer to any suitable device operable for displaying information to a user. Output device 46 may include, for example, a video display, a printer, a plotter, or other suitable output device.

Communication interface 48 may refer to any suitable device operable to receive input for server 40, send output from server 40, perform suitable processing of the input or output or both, communicate to other devices, or any combination of the preceding. Communication interface 48 may include appropriate hardware (e.g. modem, network interface card, etc.) and software, including protocol conversion and data processing capabilities, to communicate through a LAN, WAN, or other communication system that allows server 40 to communicate to other devices. Communication interface 48 may include one or more ports, conversion software, or both.

Memory device 52 may refer to any suitable device operable to store and facilitate retrieval of data, and may comprise Random Access Memory (RAM), Read Only Memory (ROM), a magnetic drive, a Digital Video Disk (DVD) drive, removable media storage, any other suitable data storage medium, or a combination of any of the preceding.

Processor 54 may refer to any suitable device operable to execute instructions and manipulate data to perform operations for server 40. Processor 54 may include, for example, any type of central processing unit (CPU).

Storage device 42 may refer to any suitable device operable for storing data and instructions. Storage device 42 may include, for example, a magnetic disk, flash memory, optical disk, or other suitable data storage device.

Filter 56 may include any form of filtering software incorporating the teachings of the present disclosure. For instance, when applied in a spam filtering context, filter 56 may comprise spam filtering software. In the illustrated embodiment, filter 56 is located on storage device 42. In alternative embodiments, filter 56 may be located in an external storage device that is in communication with storage device 40. In yet another embodiment, filter 56 may be located on client system 20, for example in computer terminal 22. The location of filter 56 is not imperative, as long as incoming data may be filtered before it is received by a user of client system 20. In particular spam filtering embodiments, the location of filter 56 may depend on the email system employed a user.

Token database 50 may be a database that is operable to store, retrieve, and update probabilities associated with tokens and metatokens. In the illustrated embodiment, token database 50 is positioned external to server 40, such that the database 50 and server 40 are in communication. In alternative embodiments, database 50 may be located in storage device 42. In other embodiments, database 50 may be located on client system 20, for instance in computer terminal 22. Although filter 56 and token database 50 are shown as distinct elements in the illustrated embodiment, in alternative embodiments the two elements may be integrated. In some particular embodiments, one "master" database may be used to provide Bayes rules, tokens, and probabilities to multiple users. This may be particularly true in spam filtering embodiments, where the resulting larger pool of users and input may result in a more accurate, uniform text classification system. In alternative embodiments, smaller, user-specific, databases may be employed. This may allow the databases to become more specifically tailored to a given user and the types of data, such as e-mail, that he or she receives. Alternatively, both styles of database may be used in combination.

A method for improved text classification according to the present disclosure will be described in detail with reference to FIG. 3. However, like most probabilistic filters, the system of the present disclosure may start with a period of "training" or "learning" as discussed with reference to FIG. 2. This training period may provide a known set of data to serve as a reference for future calculations of probabilities.

The process begins at step 102, where a set of data with known classifications is provided. In a spam filtering embodiment, this may comprise providing a set of e-mail that are already categorized as "spam" or "not spam."

At step 104, a plurality of tokens are parsed out of the data. These tokens may most commonly comprise individual words contained in the data. Parsing may be accomplished using any existing parsing technique, such as through the use of a lexical analyzer. In some embodiments, every word contained in the data will be parsed into a token. In alternative embodiments, tokens may only be parsed out for words that meet a predefined criteria. This predefined criteria may be determined by the creator of filter 56 or by a network administrator. At the same time, information may be recorded concerning the position of each token within the text, as well as the sets to which the token belongs. These sets may comprise sentences, paragraphs, or pages. For instance, information may be recorded concerning the position of a token (i.e. word) within a sentence, paragraph, or page.

At step 106, a plurality of metatokens are generated for each token. These metatokens may correlate to the recorded information regarding sets and position within sets. For example, given a set of words [x, y, z], the individual tokens x, y, and z would have been parsed at step 104. Metatokens could be generated indicating that x, y, and z were at the first, second, and third positions, respectively, within the set [x, y, z]. Additional metatokens could be generated recording larger patterns within a set, as well as the position of sets within larger sets (i.e., position of sentences within a paragraph). A rolling window could also be used to generate additional metatokens. With a size of two, the rolling window would provide metatokens recording that xy and yz are patterns in the set [x, y, z]. The use of these metatokens may allow for the learning of probabilistic grammar and syntax, which may allow the use and grouping of words to be taken into account for purposes of text classification. The number and type of metatokens may vary between different text classification applications. Increasing the amount of metatokens relied upon may increase the accuracy of the classification application. In some particular embodiments, the type and number of metatokens used may be predefined and built into the application. In alternative embodiments, these elements may be user-defined, allowing an end-user to customize and set a desired level of filtering accuracy, thereby selecting which metatokens should be taken into account for the given application.

At step 108, probabilities are computed for the tokens and metatokens. These probabilities may correlate to the likelihood that a given document falls into a particular category, based on the presence of particular tokens or metatokens. Traditionally, basic probabilistic filters may be used to determine the probability that a piece of data belongs to a given category, given the presence of a certain token in the piece of data. This simple probabilistic filtering is calculated as follows:

$$p(w) = \frac{t(w)}{t(w) + f(w)} \quad \text{Equation 1}$$

For purposes of this calculation, p(w) is the probability that a document falls into a category given that the token w exists, and t(w) and f(w) are calculated as follows:

$$t(w) = \frac{\text{number of documents in category that contain token } w}{\text{number of documents in category}} \quad \text{Equation 2}$$

$$f(w) = \frac{\text{number of documents not in category that contain token } w}{\text{number of documents not in category}} \quad \text{Equation 3}$$

Therefore, these probabilities will be calculated using the set of data provided in step 102. According to particular embodiments, an adjusted probability may then be calculated for each particular token and metatoken. To accomplish this, a beta distribution of each token and metatoken may be generated. The beta distribution is a graph of the probabilities that, after an arbitrary number of tests, the probability for that token or metatoken will end up being a given percent. As more tests are performed, the graph becomes more sharply peaked, since it is very likely that the probability calculation for the token is correct. Next, an excess kurtosis for each beta distribution may be calculated. This is a scalar description of how much more "peaked" the beta distribution is than a standard deviation, or bell curve. Positive numbers will indicate greater "peakedness" while negative numbers indicate a more broadly spread curve. A positive number may therefore be desirable, as it indicates more certainty regarding the probability calculation. The excess kurtosis can be calculated as follows:

$$\frac{6 * [a^3 + a^2(1-2b) + b^2(1+b) - 2ab(2+b)]}{[ab(2+a+b)(3+a+b)]} \quad \text{Equation 4}$$

For purposes of Equation 4, a is equal to one more than the number of times the token or metatoken is associated with the category in question, and b is equal to one more than the number of times the token or metatoken was not associated with the category in question. In particular embodiments, these values may be stored in token database 50.

The excess kurtosis for each token or metatoken is then converted into a Bayesian metaprobability value. This is performed by dividing each excess kurtosis by a maximum excess kurtosis. In some embodiments, the maximum excess kurtosis may be the highest excess kurtosis for any token in the given document. In other embodiments, the maximum excess kurtosis may a predefined baseline. Regardless, this Bayesian metaprobability value will be a value between 0 and 1. The maximum value may be stored in token database 50. The calculated metaprobability may then be used to calculate the adjusted probability for each token and metatoken, using the following calculation:

$$N + [(B-N)*M] = \text{adjusted probability} \quad \text{Equation 5}$$

For purposes of Equation 5, N is a predefined neutral setting, B is a base inferred probability, and M is the metaprobability of the given token.

After these adjusted probabilities are calculated, they may be stored in token database 50, as shown by step 110. These values may be accessed during the text classification process of the current disclosure, as described in more detail below with reference to FIG. 3. According to particular embodiments, the learning process of FIG. 2 may be carried out for a predetermined amount of time before the classification process of FIG. 3 is employed. This may allow the system to accumulate more data, which may increase the accuracy of the probabilities and metaprobabilities for usage in text classification. In alternative embodiments, the classification process may occur simultaneously with the learning process. In these embodiments, the system may continue to learn and update token database 50 based on the documents being classified.

Although the present application has been described as using Bayesian methods of probabilistic inference, other methods, such as the Fischer method, may also be employed. The Fischer method may generally be described by Equation 6 below.

$$H = C^{-1}\left(-2\ln\left(\prod_w f(w), 2n\right)\right) \quad \text{Equation 6}$$

For purposes of Equation 6, f(w) is an adjusted probability and $C^{-1}$ is the inverse chi-square function, which may derive a probability from a chi-square distribution in place of the beta distribution described above. For purposes of this approach, the adjusted probability f(w) is computed by Equation 7 below, where s is the strength given to an a priori starting priority, x is the a priori probability before any trials occur, n is the number of documents found containing the token w, and p(w) is the probability that a document containing w will fall into the category in question.

$$f(w) = \frac{[(s*x) + (n*p(w))]}{(s+n)} \quad \text{Equation 7}$$

Figure 2:
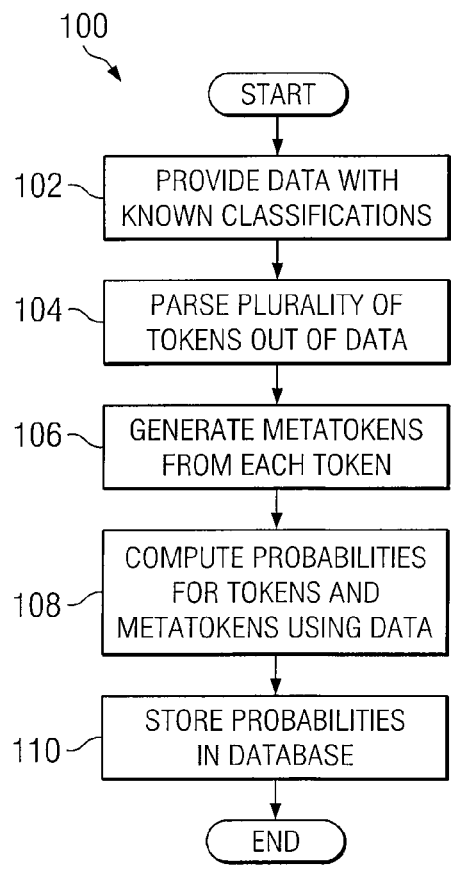
FIG. 2 is a flow diagram illustrating a method for Bayesian text classification, according to one embodiment of the present disclosure.

It should be understood that some of the steps illustrated in FIG. 2 may be combined, modified, or deleted where appropriate, and additional steps may also be added to the flow diagram.

Figure 3:
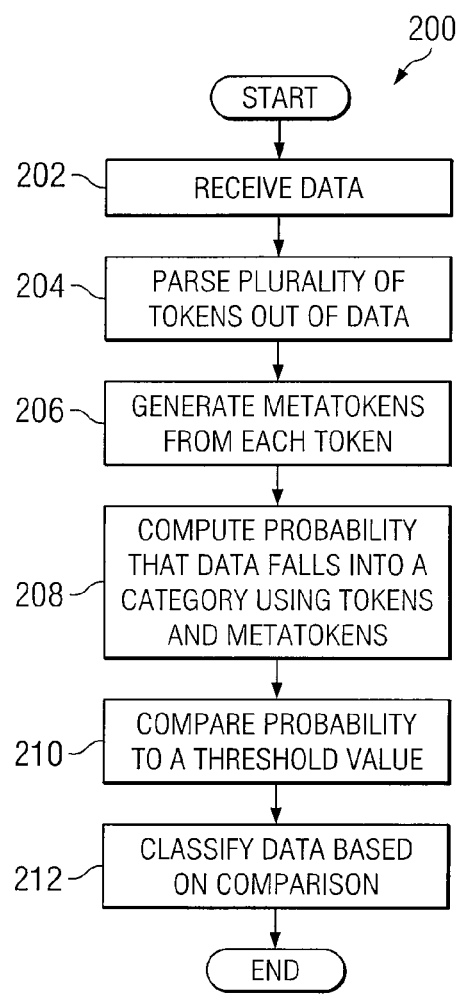
FIG. 3 is a flow diagram illustrating a method for Bayesian text classification, according to one embodiment of the present disclosure.

FIG. 3 is a flow diagram illustrating a method for Bayesian text classification, generally designated by reference numeral 200, according to one embodiment of the present disclosure.

The method begins at step 202, where data is received. This data will most commonly be in the form of text. The specific type of text will vary depending on the application. For instance, in a spam filtering application, this text will most often be in the form of an e-mail. In alternative embodiments, the data may be in other formats for which a series of tokens contained in nested, ordered sets can be defined. In one embodiment, such data may include file names. This data may be categorized to detect false positives during detection of files on a computer. Such data may also include an end user license agreement (EULA). The categorization of this data may be used to inform a user whether the associated software is valid or not.

Regardless of its format, data may be received at server 40. In the illustrated embodiment, where filter 56 is located on the server 40, the data may be stored there until the text classification method has been performed. In alternative embodiments, if filter 56 is located on client system 20, the data may be communicated from server 40 to client system 20, using communication network 30. The text classification method according to the present disclosure may then be performed on the data at client system 20.

At step 204, after the data has been received at the location where the text classification will be performed, a plurality of tokens are parsed out of the data. This is similar to the parsing process employed during the learning process at step 104. These tokens may most commonly comprise individual words contained in the data. Parsing may be accomplished using any existing parsing technique, such as through the use of a lexical analyzer. In some embodiments, every word contained in the data will be parsed into a token. In alternative embodiments, tokens may only be parsed out for words that meet a predefined criteria. This predefined criteria may be determined by the creator of spam filter 56 or by a network administrator. At the same time, information may be recorded concerning the position of each token within the text, as well as the sets to which the token belongs. These sets may comprise sentences, paragraphs, or pages. For instance, information may be recorded concerning the position of a token (i.e. word) within a sentence, paragraph, or page.

At step 206, a plurality of metatokens are generated for each token. This is similar to the generating process employed during the learning process at step 106. These metatokens may correlate to the recorded information regarding sets and position within sets. For example, given a set of words [x, y, z], the individual tokens x, y, and z would have been parsed at step 204. Metatokens could be generated indicating that x, y, and z were at the first, second, and third positions, respectively, within the set [x, y, z]. Additional metatokens could be generated recording larger patterns within a set, as well as the position of sets within larger sets (i.e., position of sentences within a paragraph). A rolling window could also be used to generate additional metatokens. With a size of two, the rolling window would provide metatokens recording that xy and yz are patterns in the set [x, y, z]. The use of these metatokens may allow for the learning of probabilistic grammar and syntax, which may allow the use and grouping of words to be taken into account for purposes of text classification. The number and type of metatokens may vary between different text classification applications. Increasing the amount of metatokens relied upon may increase the accuracy of the classification application. In some particular embodiments, the type and number of metatokens used may be predefined and built into the application. In alternative embodiments, these elements may be user-defined, allowing an end-user to customize and set a desired level of filtering accuracy, thereby selecting which metatokens should be taken into account for the given application.

At step 208, the tokens and metatokens are used to compute the probability that the data falls into a certain category. In particular embodiments, this means that words, syntax, grammar, and context may effectively be used to determine the probability that a given e-mail is spam. Database 50 may be consulted to return probabilities and metaprobabilities relating to each of these tokens and metatokens.

For individual (non-meta) tokens, the method of the present disclosure may also look for "uncommon" usage of the tokens. This functionality may help to take into account probabilistic grammar and syntax. For instance, certain tokens may be frequently used in such a way as to repeatedly generate the same metatoken. In these situations the token and generated metatoken would be said to have a high correlation rate. These relationships can be measured by metaprobabilities that measure the frequency of the relationship between the token and metatoken.

After this metaprobability measuring a relationship between token and metatoken reaches a certain threshold level, the system may begin checking for uncommon usage whenever that token is detected. According to particular embodiments, this information may be stored in a list of frequently correlated metatokens. This list may be located in storage 42, filter 56, or token database 50. This list may include all of the metatokens that have a metaprobability of being generated by the token that is above a certain threshold value. The threshold value may be a predefined value. Alternatively, the threshold value may be user-defined, based on the desired level of accuracy of the spam filter. Each of these metatokens may then be compared to the metatokens actually generated from the tokens in the document. If any of frequently correlated metatokens is not present in the document, then an "uncommon usage" token may be generated.

For individual (non-meta) tokens, the probability that the document falls into a given category is calculated as the sum of two joint probabilities, taking into account the existence of the uncommon usage tokens. This value is calculated as follows:

$$p(c|w) = p(c,u|w) + p(c, \neg u|w) \qquad \text{Equation 8}$$

For purposes of Equation 8, w is the token, u is a token representing that the token w was used uncommonly, and c represents the document belonging to the category in question. This probability may be relied on by itself for text classification, as it takes into account both the presence of individual tokens and uncommon usage thereof. However, in particular embodiments, it may be desirable to also take into account probabilities associated with metatokens as well, which may improve the accuracy of the probability calculated. For metatokens, the probability that the document falls into a given category is calculated using the adjusted probability as described above in Equations 4 and 5. The token probability calculated in Equation 8 and the adjusted probability for the associated metatokens may then be merged, using the Bayesian Chain Rule, as follows:

$$p(c \mid E) = \frac{p(E \mid c) * p(c)}{p(E \mid c) * p(c) + p(E \mid \neg c) * p(\neg c)} \qquad \text{Equation 9}$$

For purposes of Equation 9, c is the category in question, and E is the entire set of evidence, containing tokens and associated metatokens.

At step 210, the probability computed at step 108, using Equation 9, is compared to a threshold value. This value may be a predetermined value stored within client system 20, filter

56, or elsewhere in server 40. This value may be a predetermined value selected by the creator of the filter or a network administrator. In particular spam filtering embodiments, especially in work or enterprise environments, the threshold value may be altered only by someone having sufficient authority, such as a network administrator. In alternative embodiments, such as an individual's personal e-mail account, this value may be defined by the user.

At step 212, the data is classified based on the comparison performed at step 210. If the probability calculated at step 208 is less than a threshold value, the data may be classified into a first category. However, if the probability is greater than the threshold value, the data may be classified into a second category. For instance, in particular embodiments involving spam filtering, if the probability is less than the threshold value, then the document will be classified as "not spam." The documents classified as "not spam" may then be transmitted to a user's e-mail inbox. However, if the probability is above the threshold value, then the document may be classified as "spam." Various steps may be taken depending on the two categories. In spam filtering embodiments, documents classified as spam may be automatically deleted without the end user ever receiving them. In other particular embodiments, the document may be re-routed to a specific folder, such as a junk mail or spam folder.

In particular embodiments, a user may be notified of the classification determined at step 212. This method of notification may comprise various means, and may depend on the particular application. For instance, in spam filters, this notification may come in the form of routing messages to specific folders (i.e. inbox for non-spam, junk mail folder for spam). Alternatively, the user may receive a specific message that certain email has been classified as spam.

Regardless of the application or method of notification, in particular embodiments the user may be given the option to review the classification and alter it if they disagree with the classification. For instance, if a legitimate incoming email is designated as spam, the user may mark the message as "not spam." Likewise, if a spam message passes through the filter undetected, the user may mark it as spam. These user designations may allow for automatic re-routing of the message to an appropriate folder. Additionally, in particular embodiments, the changes made by the user may be taken into account in using metaprobabilities to adjust for the degree of belief. These alterations may affect the probabilities stored in database 50. In this way, the system may continue learning based on new data and user input.

It should be understood that some of the steps illustrated in FIG. 3 may be combined, modified, or deleted where appropriate, and additional steps may also be added to the flow diagram.

In addition to the advantages enumerated above, various embodiments of the present disclosure provide other benefits. In general, the text classification system of the present disclosure may allow for more accurate, nuanced classification. In particular embodiments, this may allow for a spam filter that more accurately detects spam. This my enable the filter to overcome spammers' attempts at circumvention of traditional spam filters. Additionally, a filter incorporating the teachings of the present disclosure may be less likely to mischaracterize legitimate email as spam. Various other advantages may be readily apparent to one having skill in the art.

Although the present invention has been described in detail, it should be understood that various changes, substitutions, and alterations can be made without departing from the spirit and scope of the invention as defined by the appended claims.

What is claimed is:

1. A method for classifying text, comprising:
  receiving data containing text;
  parsing a plurality of tokens out of the text;
  generating a plurality of metatokens comprising information regarding the position of the plurality of tokens within the text from which the plurality of tokens were parsed;
  calculating a first probability that the data falls into a category based on the plurality of tokens;
  calculating a second probability that the data falls into the category based on the plurality of metatokens;
  determining a third probability that the data falls into the category based on the first probability and the second probability;
  comparing the third probability to a threshold value; and
  classifying the data into the certain category if the third probability is greater than the threshold value.

2. The method of claim 1, wherein calculating the third probability further comprises using Bayes rules.

3. The method of claim 2, wherein calculating the third probability further comprises using one or more metaprobabilities to adjust for a degree of belief.

4. The method of claim 3, wherein calculating the third probability further comprises analyzing the data for tokens that are used uncommonly in relation to one or more metatokens.

5. The method of claim 1, further comprising:
  notifying a user that the data has been classified into the certain category; and
  allowing the user to change the classification to a different category.

6. The method of claim 5, further comprising using one or more metaprobabilities to adjust for a degree of belief, based on the user's changes.

7. A system, comprising:
  an interface being operable to receive data containing text;
  at least one processor being operable to:
    parse a plurality of tokens out of the text;
    generate a plurality of metatokens comprising information regarding the position of the plurality of tokens within the text from which the plurality of tokens were parsed;
    calculate a first probability that the data falls into a category based on the plurality of tokens;
    calculating a second probability that the data falls into the category based on the plurality of metatokens;
    compare the third probability to a threshold value; and
    classify the data into the certain category if the third probability is greater than the threshold value.

8. The system of claim 7, wherein the at least one processor is further operable to calculate the third probability using Bayes rules.

9. The system of claim 8, wherein the at least one processor is further operable to calculate the third probability using one or more metaprobabilities to adjust for the weight of evidence.

10. The system of claim 9, wherein the at least one processor is further operable to calculate the third probability by analyzing the data for tokens that are used uncommonly.

11. The system of claim 7, wherein the at least one processor is further operable to notify a user that the data has been classified into the certain category, and allow the user to change the classification to a different category.

12. The system of claim 11, wherein the at least one processor is further operable to use one or more metaprobabilities to adjust for the weight of evidence, based on the user's changes.

13. Logic encoded in a non-transitory computer readable medium and operable, when executed on at least one processor to:
   receive data containing text;
   parse a plurality of tokens out of the text;
   generate a plurality of metatokens comprising regarding the position of the plurality of tokens within the text from which the plurality of tokens were parsed;
   calculate a first probability that the data falls into a category based on the plurality of tokens;
   calculate a second probability that the data falls into the category based on the plurality of metatokens;
   determine a third probability that the data falls into the category based on the first probability and the second probability,
   compare the third probability to a threshold value; and
   classify the data into the certain category if the probability is greater than the threshold value.

14. The logic of claim 13, wherein the logic is further operable to calculate the third probability using Bayes rules.

15. The logic of claim 14, wherein the logic is further operable to calculate the third probability using one or more metaprobabilities to adjust for the weight of evidence.

16. The logic of claim 15, wherein the logic is further operable to calculate the third probability by analyzing the data for tokens that are used uncommonly.

17. The logic of claim 13, wherein the logic is further operable to notify a user that the data has been classified into the certain category, and allow the user to change the classification to a different category.

18. The logic of claim 17, wherein the logic is further operable to use one or more metaprobabilities to adjust for the weight of evidence, based on the user's changes.

* * * * *